(12) United States Patent
Wozniak et al.

(10) Patent No.: US 8,755,080 B2
(45) Date of Patent: Jun. 17, 2014

(54) PRINT CONTENT DEPENDENT ADJUSTMENT OF PRINTED LIQUID

(75) Inventors: Terry A. Wozniak, Springfield, OH (US); Thomas A. Henderson, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 48 days.

(21) Appl. No.: 13/534,072

(22) Filed: Jun. 27, 2012

(65) Prior Publication Data

US 2013/0120765 A1    May 16, 2013

Related U.S. Application Data

(60) Provisional application No. 61/559,751, filed on Nov. 15, 2011.

(51) Int. Cl.
*G06K 15/00* (2006.01)
*G06K 1/00* (2006.01)
*G06F 3/12* (2006.01)
*H04N 1/40* (2006.01)

(52) U.S. Cl.
USPC ............ 358/1.2; 358/1.1; 358/3.23; 358/461; 358/468

(58) Field of Classification Search
USPC ........ 358/1.1, 1.2, 1.9, 3.23, 3.24, 3.26, 3.27, 358/452, 461, 468
See application file for complete search history.

(56) References Cited

U.S. PATENT DOCUMENTS

| | | |
|---|---|---|
| 5,489,926 A | 2/1996 | Arbeiter |
| 5,608,439 A | 3/1997 | Arbeiter et al. |
| 5,784,090 A | 7/1998 | Selensky et al. |
| 6,058,844 A | 5/2000 | Niemiec |
| 6,132,021 A | 10/2000 | Smith et al. |
| 7,050,196 B1 | 5/2006 | Piatt et al. |
| 7,104,627 B2 | 9/2006 | Weast |
| 7,280,242 B2 | 10/2007 | Hobbs |
| 7,298,531 B2 | 11/2007 | Piatt et al. |

*Primary Examiner* — Thierry L Pham
(74) *Attorney, Agent, or Firm* — William R. Zimmerli

(57) ABSTRACT

A method of adjusting a level of liquid to be deposited on a print media includes providing an image processing system. Image data for a page of a print job and information regarding a printing system to be used to deposit the liquid on the print media during a printing operation is provided to the image processing system. The image data for the page of the print job is converted into a bitmap appropriate for analysis of risk of excessive inking related print defects using the image processing system. The overall risk score is determined to be acceptable or unacceptable. The bitmap is released for printing when the overall risk score is acceptable. The image data for the print job page is modified when the overall risk score is unacceptable.

18 Claims, 8 Drawing Sheets

PRINT CONTENT DEPENDENT ADJUSTMENT OF PRINTED LIQUID

CROSS REFERENCE TO RELATED APPLICATIONS

This application claims priority from Provisional Application Ser. No. 61/559,751 filed Nov. 15, 2011.

FIELD OF THE INVENTION

This invention relates generally to printing systems, and in particular to digitally controlled printing systems and associated apparatus that move a print media through the printing system.

BACKGROUND OF THE INVENTION

In printing systems and processes, for example, digitally controlled printing systems and processes (such as an inkjet printing system and process), a print media is directed through a series of components. The print media can be a cut sheet or a continuous web. A web or cut sheet transport system physically moves the print media through the printing system. As the print media moves through the printing system, liquid, for example, ink, is applied to the print media by one or more printheads through a process commonly referred to a jetting of the liquid. The jetting of liquid onto the print media introduces significant moisture content to the print media, particularly when the system is used to print multiple colors on a print media. Due to changes in its moisture content, the print media expands and contracts in a non-isotropic manner often with significant hysteresis, a phenomena known as hygroexpansivity. The continual change of dimensional characteristics of the print media often adversely affects image quality. While dryers are frequently used to remove the added moisture from the print media, which reverses the moisture-driven expansion of the print media, drying can also cause changes in the dimensional characteristics of the print media that often adversely affects image quality. This is due in part to the drying process removing moisture from the portions of the print media that were not printed on, and also due to the hysteresis inherent in the hygroexpansivity process.

During an inkjet printing process, as the print media absorbs the water-based inks applied to it, the print media desires to expand. When the direction of expansion is in a direction that is perpendicular to the direction of media travel, it is often referred to as expansion in the cross-track direction. Typically, the wrap of the print media around a roller of an inkjet printing system produces sufficient friction between the print media and the roller that the print media is not free to slide in the crosstrack direction even though the print media are beginning to expand in that direction. This can result in localized buckling of the print media 10 away from the roller 52 to create lengthwise ripples, also called flutes 54, or wrinkles in the print media, as shown in FIG. 8. When the wrinkling of the print media during the printing process is severe, it can lead to permanent creases forming in the print media, which ultimately affects image quality.

Multiple printheads are typically located and aligned by a support structure to form a linehead; the linehead containing multiple printheads being located over the print media. In many such systems, the support structure of the linehead typically locates multiple printheads in two or more rows; the rows being parallel to each other and aligned with the crosstrack direction. To prevent the print media from fluttering, that is, vibrating up and down, in the print zone, the print media is supported by a roller that is aligned with the print line of each row of printheads. When printing at high speeds, it is not uncommon for the bottom face of the support structure to become wet, either due to condensation from the moist air produced by the printing process or due to mist drops created by the print drops striking the print media.

It has been found that, under some printing conditions, the flutes in the print media can be sufficiently tall that top of the flutes can contact the bottom face of the support plate. When this occurs, the moist ink on the flutes can be smeared by the contact. Additionally, the moisture on the bottom of the support structure can be transferred to the print media. The result is a degradation of the print quality.

As such, there is an ongoing need to provide printing systems and processes, for example, digital printing systems and processes, with the ability to reduce the print defects associated with excessive print media expansion produced by the absorption of water into the print media during the printing process.

SUMMARY OF THE INVENTION

According to one aspect of the present invention, a method of adjusting a level of liquid to be deposited on a print media includes providing an image processing system. Image data for a page of a print job is provided to the image processing system. Information regarding a printing system to be used to deposit the liquid on the print media during a printing operation is provided to the image processing system. The image data for the page of the print job is converted into a bitmap appropriate for analysis of risk of excessive inking related print defects using the image processing system. The bitmap for the page of the print job is analyzed using a risk estimator to determine an overall risk score for the page. The overall risk score for the page of the print job is determined to be acceptable or unacceptable. The bitmap of the page of the print job is released for screening and printing when the overall risk score is acceptable. The image data for the page of the print job is modified when the overall risk score is unacceptable.

According to another aspect of the invention, the image data for the page of the print job can be rendered to a color managed bitmap ready to be screened and printed by a digital print engine of the printing system using the image processing system. After analysis, the bitmap of the page of the print job is released for screening and printing when the overall risk score is acceptable. The image data for the page of the print job is modified when the overall risk score is unacceptable.

BRIEF DESCRIPTION OF THE DRAWINGS

In the detailed description of the example embodiments of the invention presented below, reference is made to the accompanying drawings, in which.

DETAILED DESCRIPTION OF THE INVENTION

Figure 1:
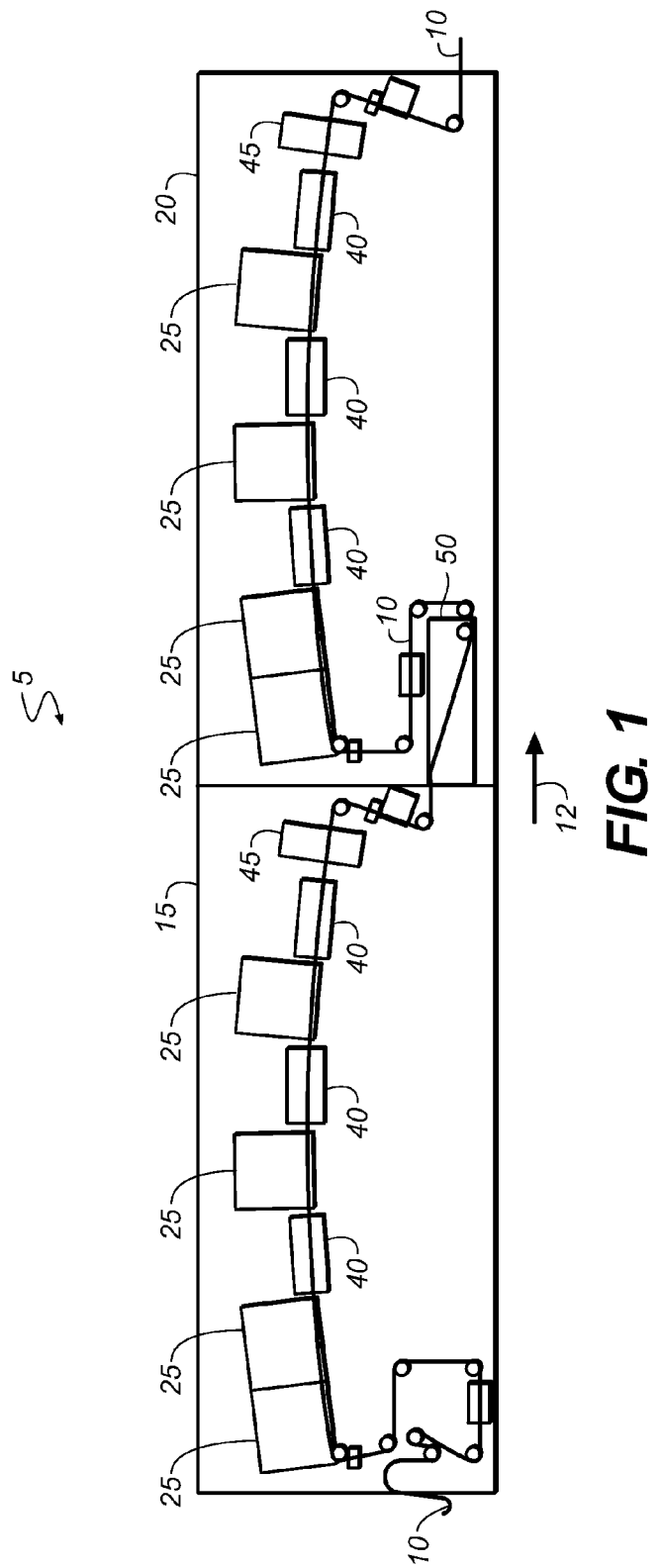
FIG. 1 is a schematic side view of a digital printing system for continuous web printing on a print media.

The present description will be directed in particular to elements forming part of, or cooperating more directly with, an apparatus in accordance with the present invention. It is to be understood that elements not specifically shown, labeled, or described can take various forms well known to those skilled in the art. In the following description and drawings, identical reference numerals have been used, where possible, to designate identical elements. It is to be understood that elements and components can be referred to in singular or plural form, as appropriate, without limiting the scope of the invention.

The example embodiments of the present invention are illustrated schematically and not to scale for the sake of clarity. One of ordinary skill in the art will be able to readily determine the specific size and interconnections of the elements of the example embodiments of the present invention.

As described herein, the example embodiments of the present invention provide a printhead or printhead components typically used in inkjet printing systems. However, many other applications are emerging which use inkjet printheads to emit liquids (other than inks) that need to be finely metered and deposited with high spatial precision. Such liquids include inks, both water based and solvent based, that include one or more dyes or pigments. These liquids also include various substrate coatings and treatments, various medicinal materials, and functional materials useful for forming, for example, various circuitry components or structural components. As such, as described herein, the terms "liquid" and "ink" refer to any material that is ejected by the printhead or printhead components described below.

Inkjet printing is commonly used for printing on paper; however, there are numerous other materials on which inkjet printing is appropriate. For example, vinyl sheets, plastic sheets, textiles, paperboard, and corrugated cardboard can comprise the print media. Additionally, although the term inkjet is often used to describe the printing process, the term jetting is also appropriate wherever ink or other liquids is applied in a consistent, metered fashion, particularly if the desired result is a thin layer or coating.

Inkjet printing is a non-contact application of an ink to a print media. Typically, one of two types of ink jetting mechanisms are used and are categorized by technology as either drop on demand ink jet (DOD) or continuous ink jet (CIJ).

The first technology, "drop-on-demand" (DOD) ink jet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil, forming a vapor bubble that creates enough internal pressure to eject an ink drop. This form of inkjet is commonly termed "thermal ink jet (TIJ)."

The second technology commonly referred to as "continuous" ink jet (CIJ) printing, uses a pressurized ink source to produce a continuous liquid jet stream of ink by forcing ink, under pressure, through a nozzle. The stream of ink is perturbed using a drop forming mechanism such that the liquid jet breaks up into drops of ink in a predictable manner. One continuous printing technology uses thermal stimulation of the liquid jet with a heater to form drops that eventually become print drops and non-print drops. Printing occurs by selectively deflecting one of the print drops and the non-print drops and catching the non-print drops. Various approaches for selectively deflecting drops have been developed including electrostatic deflection, air deflection, and thermal deflection.

Additionally, there are typically two types of print media used with inkjet printing systems. The first type is commonly referred to as a continuous web while the second type is commonly referred to as a cut sheet(s). The continuous web of print media refers to a continuous strip of media, generally originating from a source roll. The continuous web of print media is moved relative to the inkjet printing system components via a web transport system, which typically include drive rollers, web guide rollers, and web tension sensors. Cut sheets refer to individual sheets of print media that are moved relative to the inkjet printing system components via rollers and drive wheels or via a conveyor belt system that is routed through the inkjet printing system.

The invention described herein is applicable to both types of printing technologies. As such, the term printhead, as used herein, is intended to be generic and not specific to either technology. Additionally, the invention described herein is applicable to both types of print media. As such, the term print media, as used herein, is intended to be generic and not as specific to either type of print media or the way in which the print media is moved through the printing system.

Figure 2:
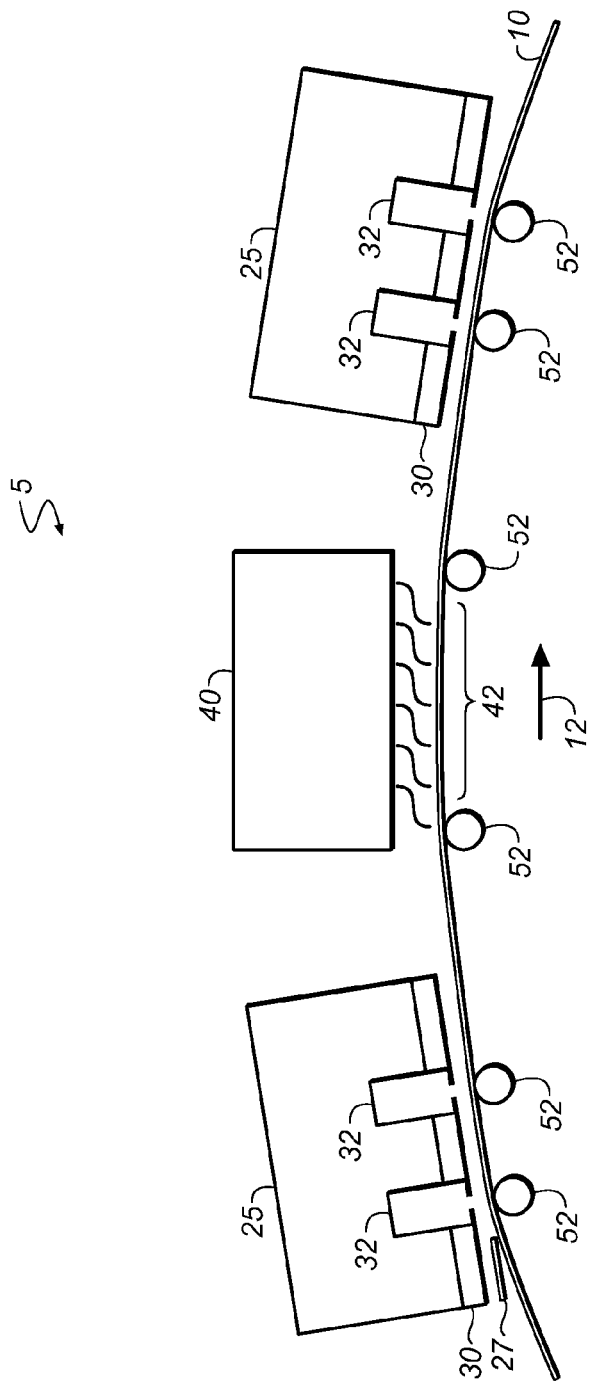
FIG. 2 is a schematic side view of components in a portion of the digital printing system including regions where increased condensation is likely.
Figure 8:
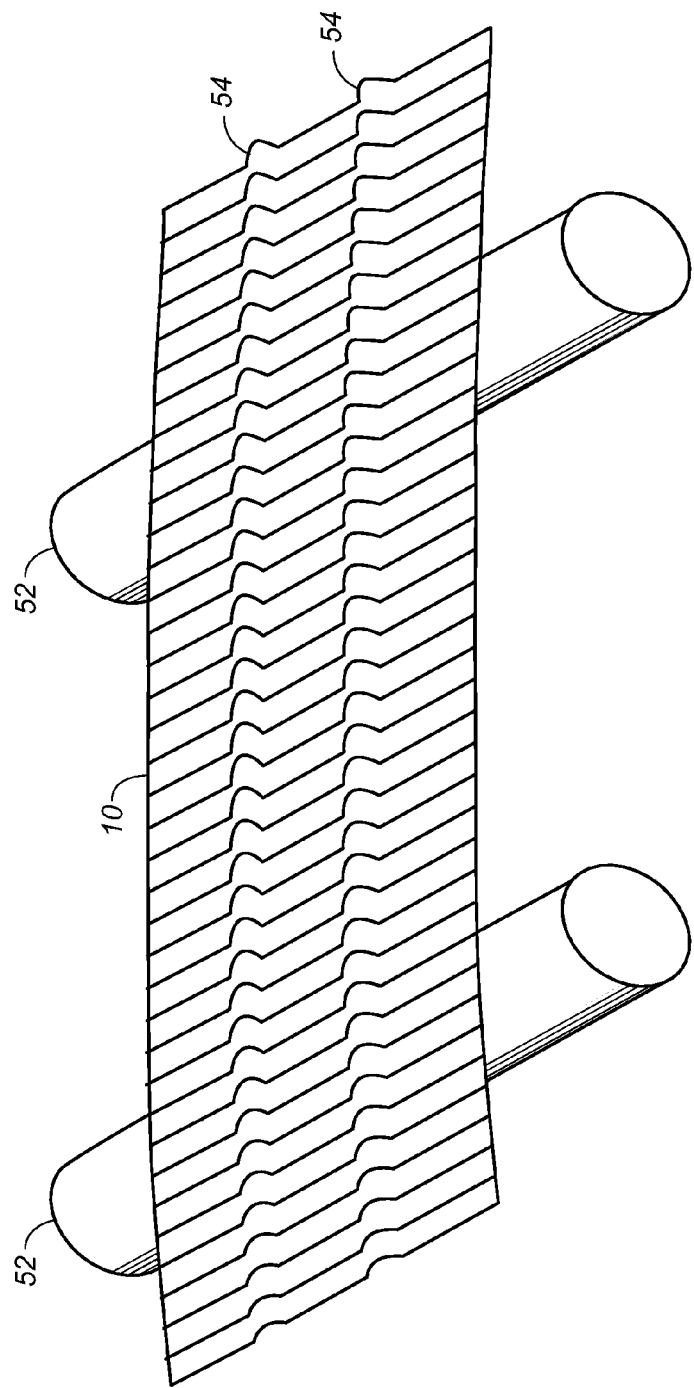
FIG. 8 is a schematic perspective view of a portion of a print media as the print media portion moves over two rollers which support the print media portion under each row of printheads.

The terms "upstream" and "downstream" are terms of art referring to relative positions along the transport path of the print media; points on the transport path move from upstream to downstream. In FIGS. 1, 2, and 8, the media moves from left to right as indicated by feed direction arrow 12. Where they are used, terms such as "first", "second", and so on, do not necessarily denote any ordinal or priority relation, but are simply used to more clearly distinguish one element from another.

Referring to FIG. 1, there is shown a digital printing system 5 for continuous web printing on a print media 10. The digital printing system 5 includes a first module 15 and a second module 20, each of which includes lineheads 25, dryers 40, and a quality control sensor 45. In addition, the first module 15 and the second module 20 include a web tension system (not shown) that serves to physically move the print media 10 through the digital printing system 5 in the feed direction 12 (left to right as shown in the figure).

The print media 10 enters the first module 15, from the source roll (not shown). The linehead(s) 25 of the first module applies ink to one side of the print media 10. As the print media 10 feeds into the second module 20, there is a turnover mechanism 50 which inverts the print media 10 so that linehead(s) 25 of the second module 20 can apply ink to the other side of the print media 10. The print media 10 then exits the second module 20 and is collected by a print media receiving unit (not shown).

Figure 3:
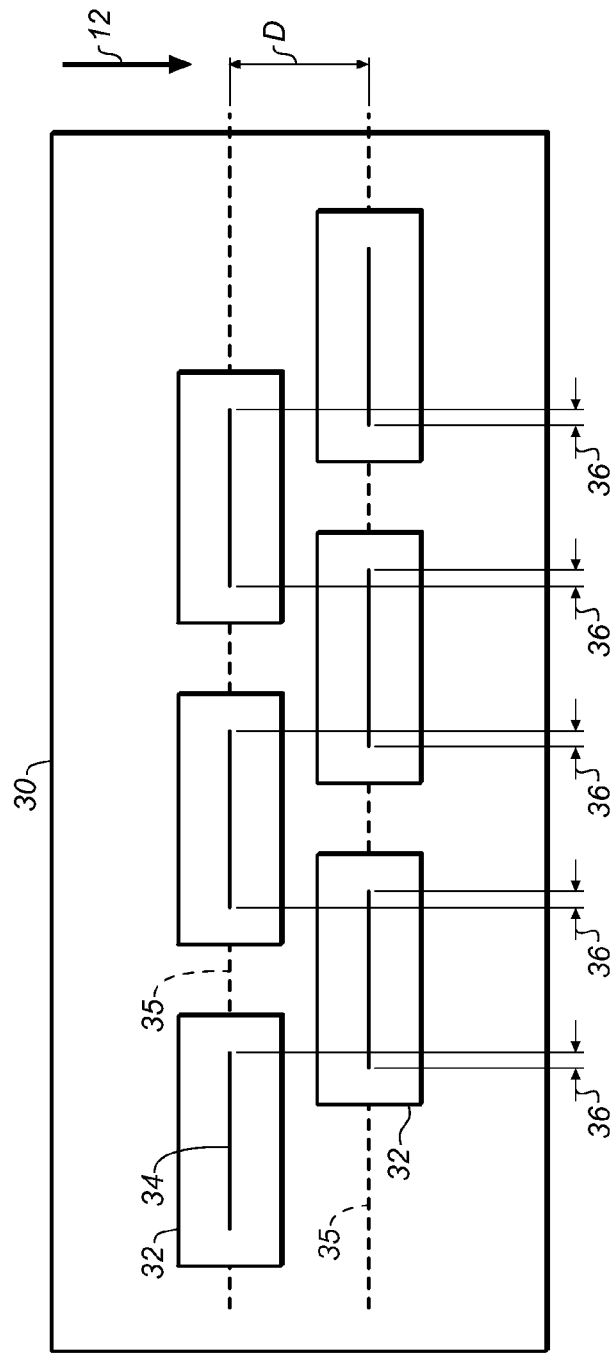
FIG. 3 is a schematic view of a support structure face adjacent to the print media, with printheads aligned in a staggered formation creating printhead overlap regions that correspond to regions where increased condensation is likely.

Referring to FIG. 2, a portion of the digital printing system 5 is shown in more detail. As the print media 10 is directed through the digital printing system 5, the lineheads 25, which typically include a plurality of printheads 32, apply ink or another liquid, via the nozzle arrays 34 of the printheads 32. The printheads 32 within the linehead 25 are located and aligned by a support structure 30. (One such arrangement of printheads 32 in the linehead 25 is shown in FIG. 3.) As the ink applied to the print media 10 dries by evaporation, the humidity of the air above the print media 10 rises in the clearance gap 27 between the printer components (for example, lineheads 25 and dryers 40) and the print media 10. To simplify the description, terms such as moisture, humid, humidity, and dew point that in a proper sense relate only to water in either a liquid or gaseous form, are used to refer to the corresponding liquid or gaseous phases of the solvents that make up a large portion of the inks and other coating fluids applied by the printheads 32. When the ink or other coating fluid is based on a solvent other than water, these terms are intended to refer to the liquid and gaseous forms of such solvents in a corresponding manner.

Referring to FIG. 3, a face of the support structure 30 that is adjacent to the print media 10 and separated by the clearance gap 27 is shown. The printheads 32 are aligned in two or more rows in a staggered formation. The nozzles arrays of the printheads in each row of printheads 32 lie along a line, called a print line 35, which is parallel to the crosstrack direction, which is perpendicular to the direction of motion of the print media denoted by the arrow 12, with the nozzle array of each printhead also aligned along the crosstrack direction. The print lines for the rows of jetting modules 34 are spaced apart by a distance D. The ends of the nozzle arrays 34 of the printheads in one row overlap with the ends of the nozzles arrays of printheads in the other row or rows to produce overlap regions 36. The overlap regions 36 enable the print from overlapped printheads 32 to be stitched together without a visible seam through the use of appropriate stitching algorithms that are known in the art. To prevent the print media from fluttering, vibrating up and down, in the print zone, the print media is supported by a roller that is aligned with the print line of each row of printheads.

Figure 4:
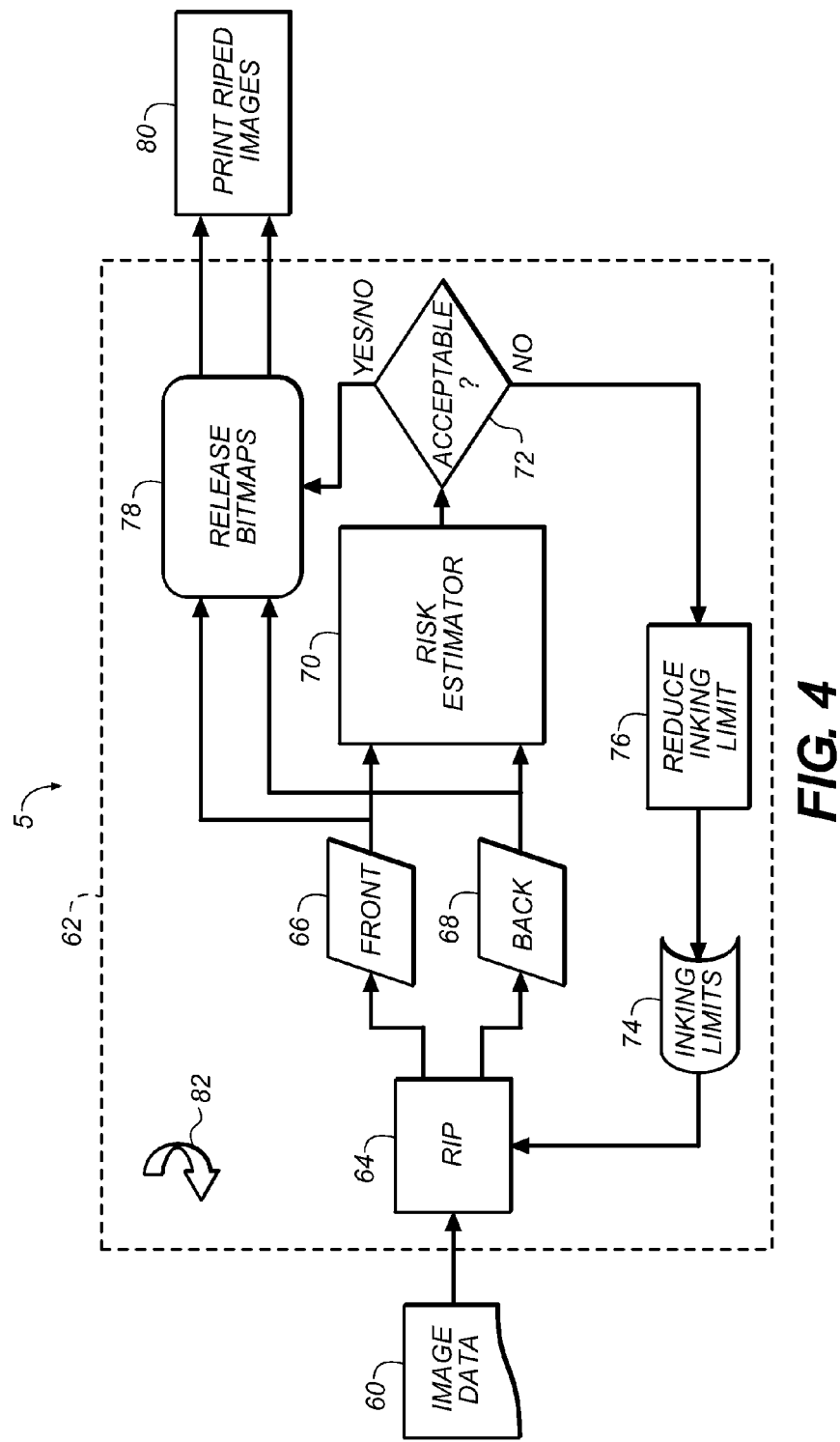
FIG. 4 describes one example embodiment of the present invention for evaluating or assessing print content and adjusting, if desired, the amount of liquid printed on a print media.

FIG. 4 shows a schematic of an embodiment of the invention. Image data for a print job that includes one or more documents is supplied to a printing system to be printed. The printing system 5 includes an image processing system 62 for receiving the image data 60, typically in a page descriptor format, and converts the image data into a bitmap format and resolution appropriate for printing by a digital print engine, such as an inkjet printer. The image processing system includes a raster image processor, RIP 64, which processes the input image data and generates the bitmap data appropriate for analysis of risk of excessive inking related print defects for the front and back side (66 and 68, respectively) of each document. The processing of the input data can include the step of employing a color management profile such as an ICC profile in linearizing the color levels based on an upper colorant limit 74, also called an inking limit or an upper liquid deposition limit, for each color, such as has been described in U.S. Pat. No. 7,050,196 or U.S. Pat. No. 7,298,531. In one example embodiment, the bitmap created by the RIP is a multi-level bitmap ready for screening, where for example each pixel has an 8 bit print density level. In other embodiments, the bitmap created by the RIP is a screened bitmap that has been converted into a print ready bitmap where each pixel has a 1 or 2 bit print density level appropriate for the print engine. The bitmaps for the front and back side images generated by the RIP are then evaluated by a risk estimator 70. The risk estimator analyzes the bitmaps to generate a coarse table or contour map of the spatial distribution of the total amount of ink to be deposited on the print media. If the bitmap being evaluated is a 1 or 2 bit print ready bitmap, the generating of the course table or contour map typically involves integrating the print density levels of a small region of pixels to determine the average print density for that region. The step of integrating the pixel print density levels for the small regions can involve integrating the pixels at a print ready resolution of 600 pixels per inch in each direction to form a new risk analysis ready multi-level bitmap at a lower resolution of for example 5 pixels per inch. With a pre-screened multi-level bitmap, it is not necessary to integrate the print density level of small regions of pixels prior to generating the coarse table or contour map of the spatial distribution of the total amount of ink to be deposited on the print media. As the use of pre-screened multi-level bitmaps involves less processing than using print ready bitmaps, the pre-screened multi-level bitmaps are generally preferred. The risk estimator will be described in detail later in the application. In one embodiment, the coarse mapping is done at approximately 5 pixels per inch, whereas the bitmap generated by the RIP has a resolution of 600 pixels per inch or greater. Using this mapping, the various regions are scored to indicate the risk of the region producing problems such as excessive fluting, wrinkles, failure to dry before the inked face contacts a roller, or other predictable degradations to print quality. From this analysis, a single risk value or score is determined for each page. If the risk value is acceptable 72, the bitmaps for the page are released 78 to be printed by the digital print engine 80. If the bitmap is a pre-screened multi-level bitmap, the step of releasing the bitmap can include the step of screening the pre-screened bitmap to form a print ready bitmap. If the risk value is not acceptable, the inking limits are reduced 76. The step of reducing the inking limits can comprise selecting a different ICC profile that has reduced ink coverage limits. This process can be iterated 82 as needed. Using the new inking limits 74 or new ICC profile, the image data 60 is again processed by the RIP 64 to generate new bitmaps 66 and 68. The new bitmaps created in this step have the same character as the first bitmap, that is, it is either a pre-screened bitmap or a print ready bitmap depending on the nature of the original bitmap. The new bitmaps are again evaluated for the risk of excessive inking problems by 70 and a decision made as to the acceptability of the risk in the excessive risk decision block 72. This cycle can be repeated until acceptable risk levels are achieved, at which time the bitmapped images are printed by the print engine 80. In some embodiments, the risk value generated by the risk estimator 70 is used in the step of reducing 76 the inking limit to determine the amount of ink reduction to carry out, so that less iteration is required to achieve acceptable inking limits.

Figure 5:
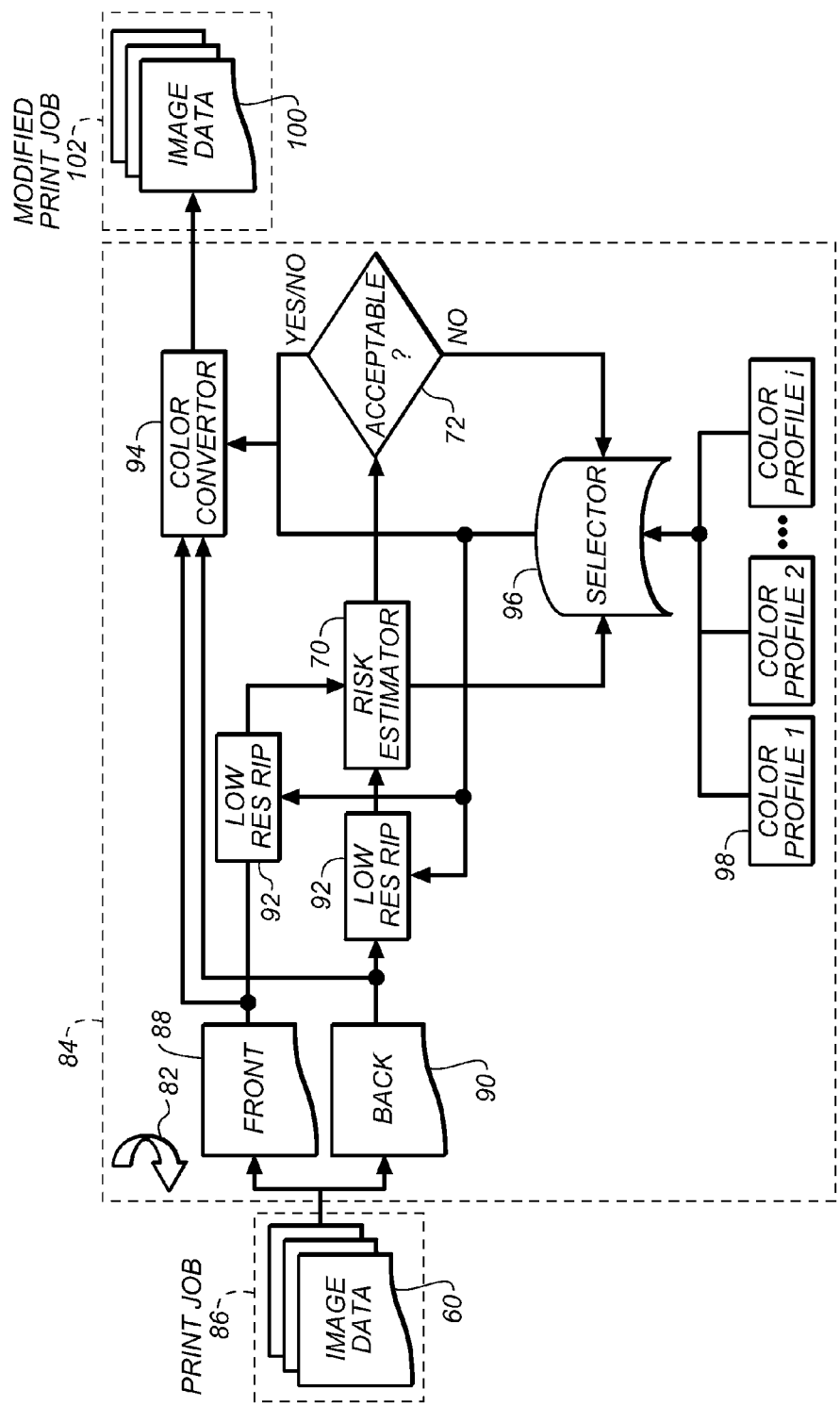
FIG. 5 describes another example embodiment of the present invention for evaluating or assessing print content and adjusting, if desired, the amount of liquid printed on a print media.

FIG. 5 shows another embodiment of the invention. In this embodiment, the image data 60 is processed by an image risk assessment module 84 off-line ahead of RIPing the image data for printing. In this embodiment, the image risk assessment module 84 includes one or more raster image processors RIPs 92 for RIPing the image data for front image 88 and the back image 90 of each page in a print job 86 at a low resolution suitable for estimating the excessive inking risk. In a preferred embodiment, the image is RIPed for the risk analysis to a pre-screened multi-level bitmap having resolution of 5 pixels per inch. The RIPing process is carried out using an initial color profile 98 provided by the profile selector 96 from a collection of color profiles 98 from 1 to profile i. As with the embodiment of FIG. 4, resulting bitmaps are evaluated by a risk estimator 70. The risk estimator analyzes the bitmaps to generate a table or contour map of the spatial distribution of total amount of ink to be deposited on the print media at the resolution of the low resolution bitmaps. From the generated ink coverage map or table, the risk estimator determines a risk value for each page of the print job 86. The risk value is supplied to the profile selector 96 and to excessive risk decision block 72. If the risk value is acceptable, the color profile used during the RIPing of the image data is supplied to the color convertor 94. The color convertor uses the selected color profile to create a modified image data file 100, which forms part of a modified image job 102. The modified print job includes color profile information, specifying which color profile is to be used for converting the image data into a bitmap appropriate for printing by a digital print engine of the printing system. If the risk value is not acceptable, the profile selector 96 selects a different color profile 98 from the collection of color profiles. Then using the selected color profile, the process of creating a new bitmap and the risk analysis is then repeated. The selection of a new color profile can depend on the risk value provided by the risk estimator so that an acceptable color profile can be identified with less iteration. When after appropriate iteration, an acceptable color profile is identified, the color convertor 94 tags the page of the print job to specify which color profile is to be used for subsequent conversion of the page to a bitmap appropriate for printing by a digital print engine of the printing system. As this embodiment involves RIPing the image data to a low resolution for the risk assessment, this embodiment can reduce the amount of image processing required when compared to the earlier embodiment in which the image data was RIPed to the resolution required for printing.

The print job 86 is processed prior to sending it to a printer to create a modified print job. Depending on the application, each page can be individually processed to provide the closest color match to the original values while avoiding excessive inking related problems. For other applications, it may be important to provide consistent colors from page to page within the print job, such as providing consistent color to all pages in a book. For such applications the image risk assessment module can process all pages to determine the risk value for each of the pages. The page with the highest risk value then is identified. The selector selects a color profile for this page. The image risk assessment module re-RIPs this page, or all pages, using the selected color profile and assesses the excessive inking risk based on the selected color profile. When an appropriate color profile is identified, the identified color profile is used by the color convertor to modify all the pages in the print job.

Figure 6:
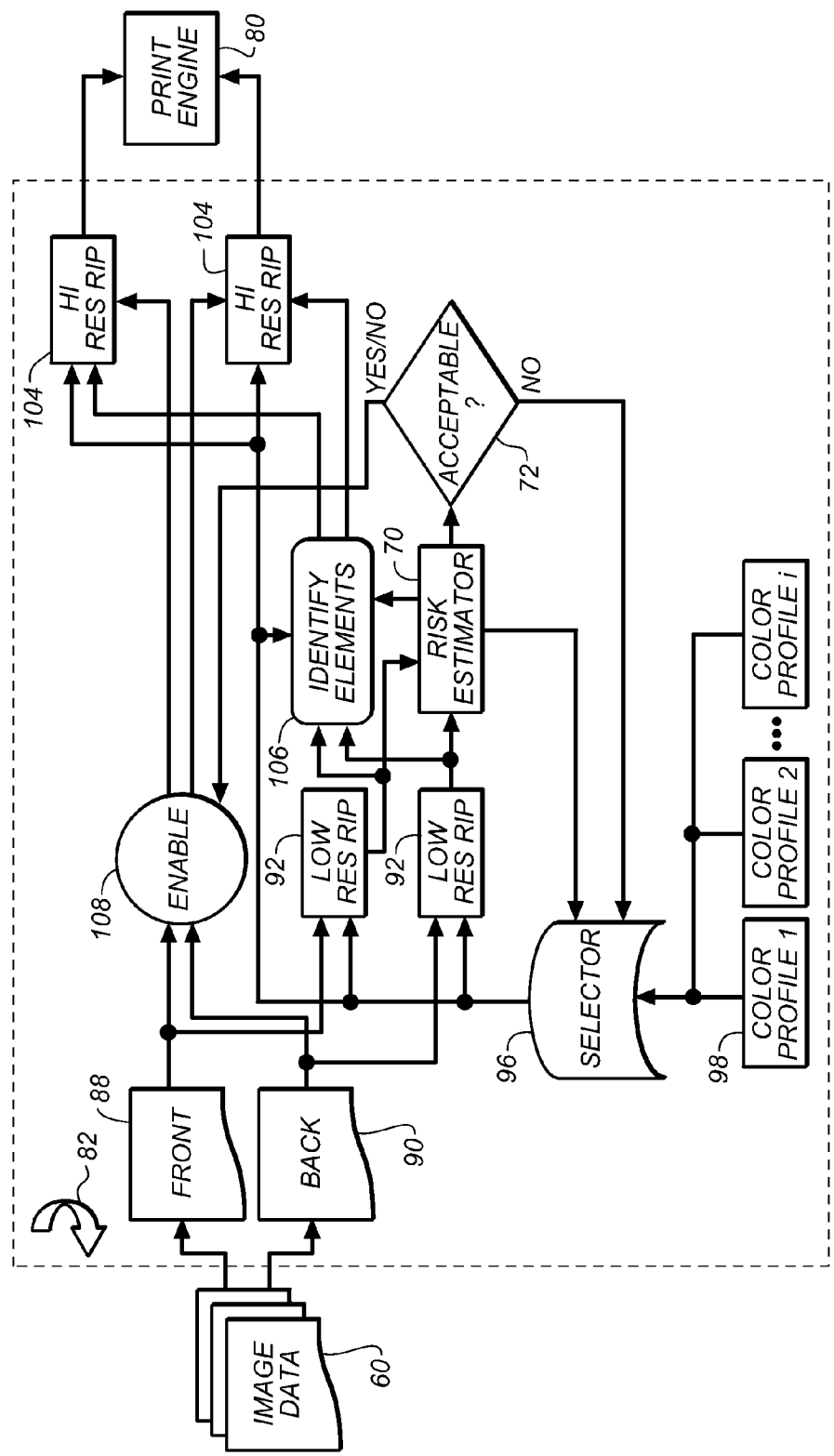
FIG. 6 describes another example embodiment of the present invention for evaluating or assessing print content and adjusting, if desired, the amount of liquid printed on a print media.

FIG. 6 shows another embodiment of the invention. This embodiment includes one or more low resolution RIPs 92 for creating the low resolution bitmaps appropriate for analysis of risk of excessive inking related print defects, typically as pre-screened multi-level bitmaps, based on the front side image data 88 and back side image data 90, used for the excessive inking risk analysis and one or more high resolution RIPs 104 for creating the screened, print-ready bitmaps required for printing from the same front and back side image data. The risk estimator 70 creates an excessive inking risk value for each page from the low resolution bitmaps. The print resolution RIPs are prevented from processing the front and back side image data by the RIP enable 108 until a color profile 98 with an acceptable inking level is identified. If the risk value is acceptable as determined by the excessive risk decision block 72, the one or more high resolution RIPs are enabled 108 to create the high resolution screened print-ready bitmaps using the color profile 98 that had been selected by the profile selector 96 to create the low resolution bitmaps. If the risk value is excessive, the profile selector 96 selects a different color profile 98 having a lower inking limit. The profile selector can use the estimated risk value in selecting the appropriate color profile to minimize the number of iterations 82 required for achieving acceptable risk levels.

If the risk analysis determines that the inking level was excessive within a page, the risk estimator determines the spatial regions within the page that had the highest risk. That information is transferred to the element identifier, which identifies the image elements (the pictures, graph elements or components, such as the bars of a bar graph, large text, etc), which were located in the determined spatial regions of high risk, that were responsible for the high risk values. Identifying the high risk elements enables the use of one color profile for the high risk elements and a second profile of the remaining elements of the page. The system need not be limited in the number of color profiles that can be used for different elements within a page. The use of different color profiles for different elements on a page is an option that can be used with some printing applications to retaining the desired color intensity of the objects on a page while reducing the inking level for only the image element(s) that have the highest excessive inking risk. It may, however, be inappropriate for other printing applications as it can lead to inconsistent color within a page.

Figure 7:
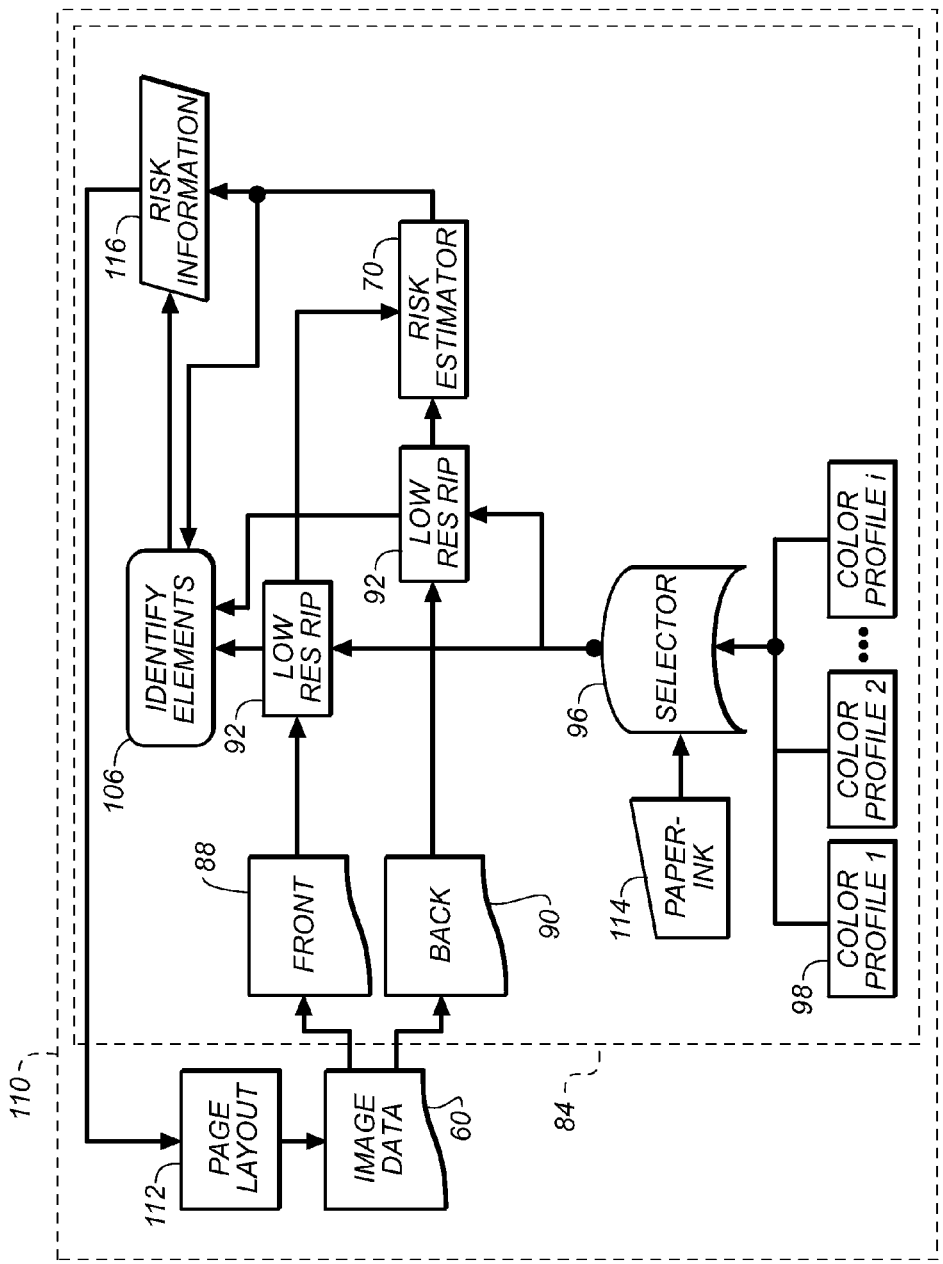
FIG. 7 describes another example embodiment of the present invention for evaluating or assessing print content and adjusting, if desired, the amount of liquid printed on a print media.

FIG. 7 shows another embodiment of the invention. This embodiment of the invention provides excessive inking risk information by means of a risk analysis module 84 in the context of a page layout system 110. The page layout software 112 within the page layout system is used to define the image data 60 to be printed on a printing system. The risk analysis module 84 processes the image data in much the same as the other embodiments. The front side image data 88 and the back side image data 90 of a page are RIPed by one or more low resolution RIPs 92 to bitmaps appropriate for analysis of risk of excessive inking related print defects, typically to a pre-screened multi-level bitmap. The resolution used for the RIP can be much lower than are required for RIPing the data for actual printing, and the resultant bitmap is typically a multi-level bitmap. A RIP resolution of as little as five pixels per inch is acceptable. The RIPing process makes use of a color profile 98. Preferably the color profile is selected by the profile selector 96 based on the ink and paper combination 114 to be used for printing the print job. This RIPed bitmap data is analyzed by the risk estimator 70 to produce risk value indicative of the risk of having the print degraded due to excessive inking. The risk information 116 is provided to the software 112 of the page layout system, so that the software either automatically or by prompting the user can alter the page layout to lower the risk of producing an excessive inking defect. In some embodiments of the risk analysis module 84, if the risk analysis determines that the inking level is excessive within a page, the risk estimator determines the spatial regions within the page that have the highest risk. That information is transferred to the element identifier 106, which identifies the image elements (the pictures, graph elements, large text, etc) that were responsible for the high risk values. Information related to which element(s) are responsible for the high risk value is then provided as a portion of the risk information by the risk analysis module to the page layout software 112.

The risk that the image data of a given page my incur wrinkles or excessive fluting is determined by an image analysis algorithm. A color image, where the above mentioned problems are most likely to occur, usually contains four planes of image data, one for each of cyan, magenta, yellow and black. The image values in each plane conform to one of several standard color representations. In the US, the SWOP (Standard Web Offset Press) standard is popular. An image file conforming to this standard has colors represented cyan, magenta, yellow and black (CMYK) in a way that produces good results on a web offset press.

Other printing devices, such as an ink jet printer, require that these values be transformed into a CMYK representation that is more suited to the print media and the printing technology, In particular, if water based inks are used on thin paper the total volume of ink must typically be minimized.

Ink minimization is accomplished using ICC color profiles. The color profiles can transform the SWOP expression of CMYK into an appropriate expression for an ink jet printer. A color profile 98 can transform the appearance of the colors as well, but do so in a way that the relationships of the colors on the printed page are perceptually consistent. So, a color profile meant to minimize the amount of ink used may reduce the intensity of the colors relative to the original SWOP intent in order to avoid fluting, wrinkling, rubbing and poor drying of inks.

The amount of ink reduction that is required depends on the content of the page. Pages with small areas of ink do not cause fluting and wrinkling, but pages with large areas of dark, or high ink lay down, colors are at risk of these print defects. The risk estimator algorithm finds these pages.

Bitmapped images are represented as a raster of pixel values, in image planes corresponding to each ink color, for example C, M, Y, and K. The risk estimator algorithm 70 begins by examining the pixel values of each image or color plane individually. A square group of nine contiguous pixels is used as a kernel within which some logical operations are performed. First, the algorithm determines if all the pixel values are within a certain range that would indicate a substantially constant color that is common to all 9 pixels. In one example embodiment, the nine pixels are considered to be substantially constant if all nine pixels have print density value is within +–20 of the center pixel's value, on a scale from 0 to 255. If such an arrangement is found, the existence of a new "group" is declared, and a unique identifier is associated with that group. All nine pixels are marked to indicate the group to which they belong.

The kernel is then moved over in the image by one column of pixels. The new group of pixels is again tested to determine if all nine pixels have a substantially constant value. If that condition is true, each of the nine member pixels is examined to see if any of them already belong to a group. The minimum group identifier in the set is taken as the group identifier in this kernel location and each pixel is again marked with the group identifier value. As this process continues, and the image values are substantially constant, a large area of the image is aggregated into a single group. If at some point, the test for substantially constant values within a kernel fails, the pixels of that kernel are not assigned the group value, but they retain whatever group ID they were previously assigned. Effectively, the end of the substantially constant area is detected and the process begins again, potentially finding a new area of substantially constant values, or skipping over areas where the variation in the image is high and no particular constant pixel values exist.

When the kernel has been scanned to the edge of the image, the process begins again on the next row of pixels. If the member pixels are again substantially constant, the group identifier from the previous row of pixels will insure that this new kernel is admitted to the previously discovered group and the area of the group will increase by one more pixel. When the end of the entire image plane is reached, this process has created a collection of groups, each identifying areas in the image plane with substantially constant inking coverage values.

This process is carried out independently for each of the image planes, for example, C, M, Y, and K, so that each image plane has an associated group mapping of the original pixels into similar coverage level groups. The risk estimator algorithm then compares the group maps of each of the image planes to each other. In some embodiments, the comparison of the image plane group maps includes comparing the image plane group maps on both sides of the print media, while in other embodiments only the group maps on a single side of the print media are considered. Again a 3×3 kernel is defined, but this time on the group maps. If group identifiers in at least two of the planes are consistently defined in all nine pixels, a further top level group is defined. This top level group has another unique identifier number, an identifier of the image planes that have consistent group identifiers for the group, and the average print density values for each of the image plans from the original image for the pixels within the group. Likewise, the kernel is scanned across and down the entire image, forming aggregate groups that contain similar characteristics.

When risk estimator 70 has finished this process, the page or document has an associated list of similar coverage level groups, each group associated with a contiguous region of the original printable image that has substantially constant print density values for the various image planes. The characteristics of these groups are also known, the planes of data which have constant values, and the average of the underlying print density values for each of the image planes.

Each group is scored by the risk estimator 70 using a formula or look up table to indicate a risk level for an excessive inking related print defect for that group. In a preferred embodiment of the invention, the risk score rises as the average ink coverage rate for the group increases and as the spatial extent of the coverage for the group increases. In certain embodiments, the risk score increases more significantly for an increase in the coverage of yellow ink than it does for black ink, as the yellow ink absorbs less radiant energy in the dryer than does the black ink and therefore is more difficult to dry. In certain embodiments, the risk score increases more quickly with increases in the group extent in the in-track direction than in the crosstrack direction, as the fluting risk is more dependent on the extent or length of ink coverage in the in-track direction than it is on the extent or length of ink coverage in the crosstrack direction. In some embodiments, the risk score also depends on the crosstrack position of the pixels in the group, for example, the spatial alignment of pixels in the group with printing system structures downstream of the printheads, such as nip rollers that could contact the potentially still wet printed surface of the print media would increase the risk value for the ink coverage group. In some embodiments, the risk score depends on the type of ink and print media to be used for printing the print job as the risk of excessive inking related print defects is dependent of the types of inks and print media being used. The risk score for a group is related to the risk of excessive inking related print defects for the group. The risk score therefore also provides an indication on how much ink reduction must be applied to the pixels of the group to avoid these undesirable effects. In each of these embodiments, the risk score is directly related to the risk of having excessive inking related print defects, the risk score rising with increased risk. It is anticipated and within the scope of the claimed invention to use a function or look up table that generates risk scores that are inversely related to the risk of having excessive inking related print defects, so that risk score decreases with increasing risk of having excessive inking related print defects.

A risk score for the page is generated from the risk scores of the groups on the page. In one embodiment, the risk score for the page corresponds to the risk score for the group on the page with the highest risk score. In other embodiments the risk estimator combines the risk scores of at least the two groups having the highest risk scores to form a risk score for the page.

As used above, the term digital printing system includes inkjet printing systems. The invention described herein can be used with an offset printing press technology or another traditional printing press technology that prints on the print media as the print media travels through the printing system in addition to a digital printing technology that prints on the print media as described in conjunction with the present invention as the print media travels through the printing system. The invention is of particular value, however, to that portion of the entire printing system in which digital printing, accomplished by a process such as inkjet printing, is carried out.

The invention has been described in detail with particular reference to certain preferred embodiments thereof, but it will be understood that variations and modifications can be effected within the scope of the invention.

PARTS LIST

5 Digital printing system
10 Print media
12 Feed direction
15 First module
20 Second module
23 Component
25 Linehead
27 Clearance gap
30 Support structure
32 Printhead
34 Nozzle array
35 Print line
36 Overlap regions
40 Dryer
42 Heat
45 Quality control sensor
50 Print media turnover mechanism
52 Roller
54 Flute
60 Image Data
62 Image Processing System
64 RIP
66 Front Side Bitmap
68 Back side Bitmap
70 Risk Estimator
72 Excessive Risk Decision Block
74 Inking Limits
76 Inking Limit Reducer
78 Bitmap release
80 Print Engine
82 Iterated
84 Image Risk Assessment Module
86 Print Job
88 Front Side Image Data
90 Back Side Image Data
92 Low Resolution RIP
94 Color Convertor
96 Profile Selector
98 Color Profile
100 Modified image data
102 Modified Print Job
104 Print Resolution RIP
106 Element Identifier
108 RIP Enable
110 Page Layout System
112 Page Layout Software
114 Ink Paper Combination
116 Risk Information

The invention claimed is:

1. A method of adjusting a level of liquid to be deposited on a print media comprising:
providing an image processing system;
providing image data for a page of a print job to the image processing system;
providing information regarding a printing system to be used to deposit the liquid on the print media during a printing operation to the image processing system;
converting the image data for the page of the print job into a bitmap appropriate for analysis of risk of excessive inking related print defects using the image processing system;
analyzing the bitmap for the page of the print job using a risk estimator to determine an overall risk score for the page;
determining whether the overall risk score for the page of the print job is acceptable or unacceptable;
releasing the bitmap of the page of the print job for printing when the overall risk score is acceptable; and
modifying the image data for the page of the print job when the overall risk score is unacceptable.

2. The method of claim 1, wherein analyzing the bitmap for the page of the print job using a risk estimator includes:
generating a table of image regions in which liquid deposition is substantially constant with the region, the region including a spatial distribution of a total amount of liquid to be deposited on the print media for the page of the print job;
evaluating the image regions by associating with the image regions a risk score indicating a likelihood of an image region producing a print quality degradation; and
determining an overall risk score for the page using the risk scores associated with the image regions for the page of the print job.

3. The method of claim 2, wherein the risk score associated with the image regions depends on the spatial distribution of a total amount of liquid to be deposited in the image region.

4. The method of claim 3, wherein the risk score associated with the image regions is higher when at least one of an average liquid coverage rate for the image regions increases and a spatial extent of the liquid coverage increases.

5. The method of claim 2, wherein the risk score associated with the image regions depends on the spatial distribution of a total amount of liquid to be deposited in the image region on a front side and a back side of the page of the print job.

6. The method of claim 2, wherein modifying the image data for the page of the print job when the overall risk score is unacceptable includes modifying only the image regions having a risk score indicating a likelihood of the image region producing a print quality degradation.

7. The method of claim 1, the page of the print job including an image resolution, wherein the bitmap of the page of the print job generated for analysis by the risk estimator includes an image resolution that is lower than the image resolution of the page of the print job.

8. The method of claim 1, wherein modifying the image data for the page of the print job when the overall risk score is unacceptable includes altering a color profile to be used to convert the image data for the page of the print job into the bitmap appropriate for printing by a digital print engine of the printing system.

9. The method of claim 8, wherein altering the color profile includes using liquid deposition level that is less than a liquid deposition level that was included in the color profile to be used to convert the image data for the page of the print job into the bitmap appropriate for printing by a digital print engine of the printing system.

10. The method of claim 8, wherein altering the color profile includes using a different color profile selected from a collection of color profiles.

11. The method of claim 10, wherein the different color profile is selected based on the overall risk score for the page of the print job.

12. The method of claim 1, wherein the analyzed bitmap includes a multi-level bitmap.

13. The method of claim 1, wherein modifying the image data for the page of the print job when the overall risk score is unacceptable includes modifying all pages of the print job in the same manner as the analyzed page.

14. The method of claim 1, further comprising converting the image data for the page of the print job into a bitmap appropriate for printing by a digital print engine of the printing system using the image processing system, wherein releasing the page of print job includes releasing the bitmap of the page of the print job for printing that is appropriate for printing by a digital print engine of the printing system.

15. The method of claim 1, wherein modifying the image data of the page of the print job includes tagging the page of the print job to specify the color profile to be used to convert the image data into a bitmap appropriate for printing by a digital print engine of the printing system.

16. The method of claim 1, wherein modifying the image data for the page of the print job when the overall risk score is unacceptable includes providing the risk information to page layout software of a page layout system such that the page layout software either automatically or through prompting by a user alters the page layout to lower the risk of producing an excessive inking defect.

17. The method of claim 1, wherein the method of claim 1 is carried out in a digital printing system concurrently with the printing of previously analyzed pages of the print job.

18. The method of claim 6, wherein modifying only the image regions having the risk score indicating a likelihood of the image region producing a print quality degradation includes identifying the image element within a page creating the risk score indicating a likelihood of the image region producing a print quality degradation and modifying the ink coverage of the identified image element.

* * * * *